United States Patent [19]
Loup

[11] Patent Number: 5,476,418
[45] Date of Patent: Dec. 19, 1995

[54] DISTRIBUTOR BOX FOR A HEATING AND VENTILATING INSTALLATION FOR THE CABIN OF A MOTOR VEHICLE

[75] Inventor: Didier Loup, Maurepas, France

[73] Assignee: Valeo Thermique Habitacle, Saint-Denis, France

[21] Appl. No.: 221,476

[22] Filed: Apr. 1, 1994

[30] Foreign Application Priority Data

Mar. 31, 1993 [SE] Sweden .................... 93 03791

[51] Int. Cl.⁶ .................... B60S 1/54
[52] U.S. Cl. .................... 454/121; 454/126
[58] Field of Search .................... 454/121, 126, 454/127

[56] References Cited

U.S. PATENT DOCUMENTS

| | | | |
|---|---|---|---|
| 4,852,638 | 8/1989 | Hildebrand et al. | 454/127 X |
| 4,972,992 | 11/1990 | Scheidel et al. | 237/12.3 A |
| 5,106,018 | 4/1992 | Loup | 454/126 X |

FOREIGN PATENT DOCUMENTS

| | | |
|---|---|---|
| 0216104 | 4/1987 | European Pat. Off. . |
| 0354163 | 2/1990 | European Pat. Off. . |
| 0447304 | 9/1991 | European Pat. Off. . |
| 0461421 | 12/1991 | European Pat. Off. . |
| 1573588 | 5/1969 | France . |

OTHER PUBLICATIONS

Patent abstracts of Japan vol. II, No. 327–24, Oct. 1987 and JP–A–62 110 512–21 May 1987.

*Primary Examiner*—Harold Joyce
*Attorney, Agent, or Firm*—Morgan & Finnegan

[57] ABSTRACT

A heating and ventilating installation for the cabin of a motor vehicle includes a distributor box which has an air inlet arranged to admit a stream of cold air and a stream of heated air. The distributor box also has a plurality of air outlets, including a de-icing air outlet port. A distributor valve is arranged to pivot within the distributor box, and has a guide channel extending in a direction which is generally transverse with respect to the pivot axis of the valve, so as to direct the stream of heated air towards the de-icing air outlet port when the valve is set in a position for de-icing.

4 Claims, 2 Drawing Sheets

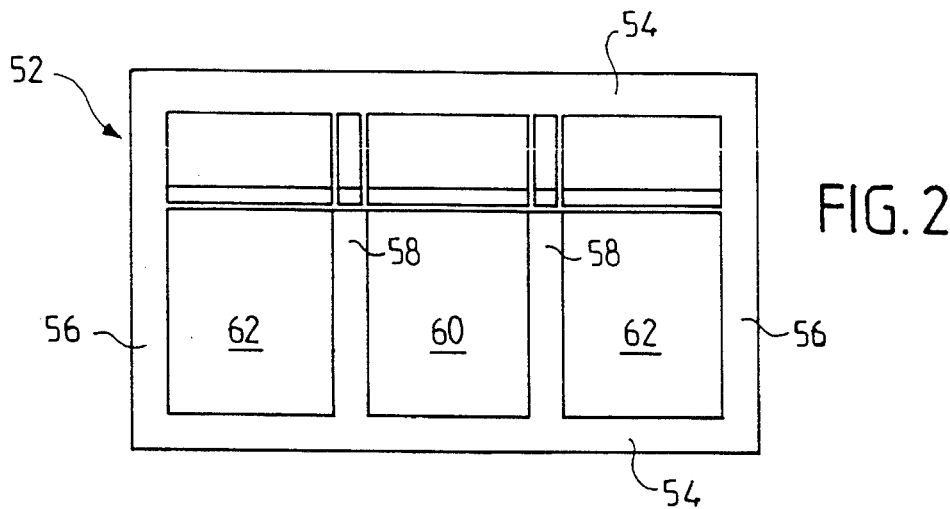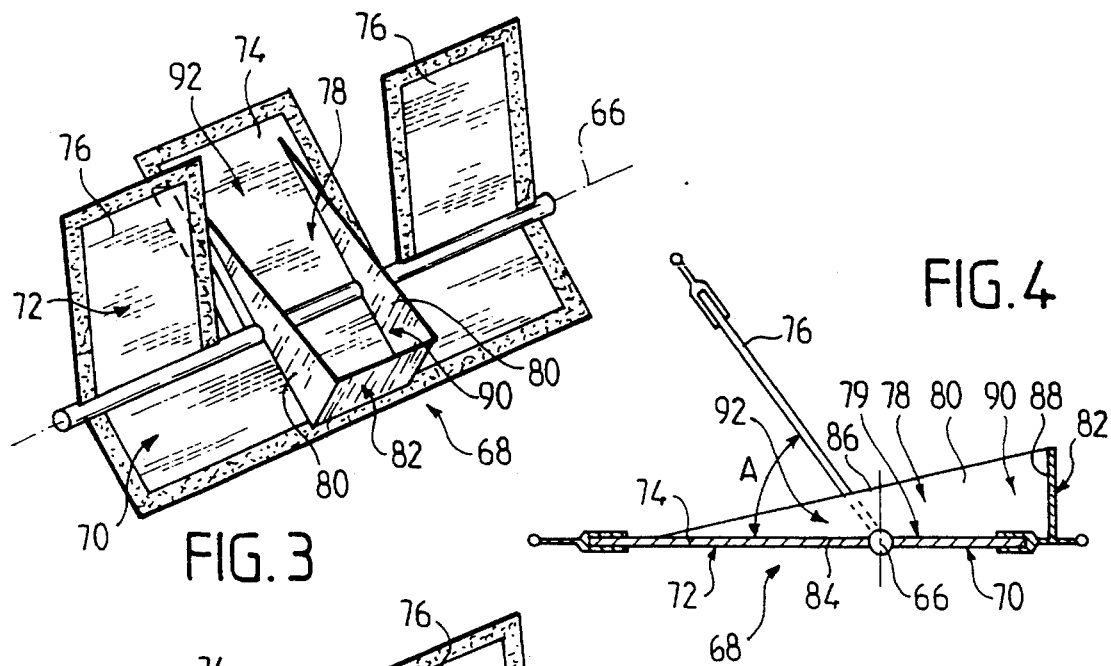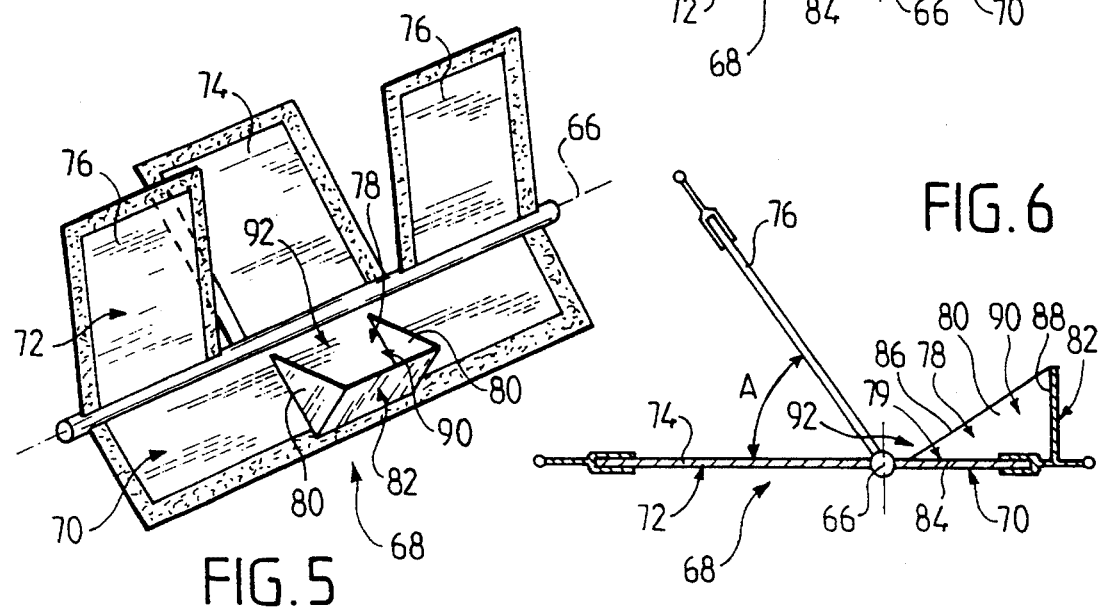

DISTRIBUTOR BOX FOR A HEATING AND VENTILATING INSTALLATION FOR THE CABIN OF A MOTOR VEHICLE

FIELD OF THE INVENTION

This invention relates to heating and ventilating installations for the cabin of a motor vehicle, and more particularly to a distributor box which forms part of such an installation.

BACKGROUND OF THE INVENTION

It is known, in particular from French patent application No. 90 03279 in the name of the present Applicants, to provide a distributor box, or distribution housing, of a type which includes an air inlet arranged to admit a stream of cold air and/or a stream of heated air, together with a plurality of air outlets which are open towards various different zones within the cabin of the vehicle. These outlets comprise, in particular, a de-icing air outlet port which is open towards the windshield of the vehicle. The distributor box also contains a distributor valve which is mounted for pivoting movement about an axis inside the distributor box, for adjusting the distribution of the air between the various air outlets.

The air inlet of the distributor box is connected to the outlet of a heater housing which is adapted for producing a stream of cold air and a stream of hot air in adjustable proportions, according to the particular conditions required by the user.

Except in the extreme settings of the distributor valve, in which either only a stream of cold air or only a stream of heated air is produced, i.e. in intermediate positions of the valve, these two air streams generally leave the heater housing in the form of adjacent or stratified streams, so as to obtain what is referred to as temperature stratification. The two air streams are then introduced into the distributor box, in which they may again become mixed in proportions which are variable according to the zone or zones of the cabin to which they are to be directed.

Conventionally, apart from the de-icing air outlet which is open towards the windshield, the distributor box also has at least one ventilating air outlet which is open at the level of the fascia of the vehicle, together with at least one lower air inlet which is open into the lower part of the cabin, that is to say in such a way as to direct air towards the feet of the occupants of the vehicle.

The distributor valve may in particular be put into a "de-icing" position in which a stream of air is delivered towards the windshield, and a position which may be referred to as its "de-icing and foot warming" position, in which a stream of air is delivered simultaneously towards the windshield and towards the feet of the occupants of the vehicle. In these two positions, the stream of cold air and the stream of heated air delivered towards the windshield have a tendency to mix, so that the temperature of the air, thus mixed, is lower than the temperature of the heated air stream, thus having reduced effectiveness for deicing and de-misting the windshield.

DISCUSSION OF THE INVENTION

A main object of the invention is to overcome the above mentioned drawback.

To this end, according to the invention there is provided a distributor box of the kind defined above, in which the distributor valve includes a guide channel having an inlet and an outlet and extending in a generally transverse direction with respect to the pivot axis of the distributor valve, in such a way that, in de-icing positions of the valve, the inlet of the guide channel is open to the inlet of the distributor box, on that side of the said inlet through which the hot air stream is introduced into the distributor box, while the outlet of the guide channel is open to the de-icing air outlet port.

This guide channel enables the stream of heated air leaving the distributor box to be channeled and directed towards the windshield in order to obtain improved de-icing Or de-misting effects. In this way, the guide channel enables the heated air stream to be taken up into the de-icing air outlet port with a statification effect, the heated air stream being directed upwardly, while the cold air stream is directed downwardly.

In addition, the cold air stream may be mixed with the heated air stream in order to form an air stream at an intermediate temperature which can then be delivered, in particular, to the lower part of the cabin.

The guide channel is preferably arranged in a central region of the distributor valve, which enables the heated air stream to be channeled by itself, while also defining two lateral regions in which a stream of air at intermediate temperature between that of the cold air stream and that of the heated air stream may be directed.

In accordance with a further feature of the invention, the guide channel is arranged on one face only of the distributor valve. The guide channel is then, preferably, defined by this face of the distributor valve, by two side walls which extend in planes substantially parallel to each other and at right angles to the said face of the valve, and by an anterior wall which delimits the inlet of the guide channel and which joins the two side walls together, the anterior wall being joined to the said face of the distributor valve in a plane which is substantially at right angles to the plane of the valve.

The side walls may be substantially triangular in shape, with each said side wall defining a first side thereof attached to the valve, a second side defining an acute angle with the first side, and a third side which lies at the inlet of the guide channel and which is joined to the anterior wall.

In a modification, each of the side walls of the guide channel is arranged on the same side of the distributor valve with respect to the pivot axis of the latter.

In another modification, each side wall of the guide channel extends over both sides of the guide channel, i.e. on both sides of its pivot axis.

Preferably, the distributor box has two ventilating air outlets, lying on either side of the de-icing air outlet port and being open towards ventilating air vents, the distributor valve having one valve portion lying on one side of the pivot axis and controlling the entry of air into the distributor box, and another portion which lies on the other side of the pivot axis, this last mentioned valve portion comprising a central vane which controls the delivery of de-icing air, and two side vanes, each of which controls entry of air to a respective one of the ventilating air outlets. With this arrangement it is possible to control the air flow to all of the various outlets of the distributor box using a single valve.

The guide channel preferably lies in a central region of the first valve portion and/or a central region of the central vane of the second valve portion.

In accordance with a preferred feature of the invention, the air inlet of the distributor box on the one hand, and the two ventilating air outlets and the de-icing air outlet port on the other hand, are arranged in regions which are diametrically opposed to each other with respect to the pivot axis of the distributor valve. The distributor box then also has a lower air outlet duct which is open towards the lower part of the cabin of the vehicle and which lies adjacent to the air inlet of the distributor box, so that the distributor valve can assume a "de-icing and foot warming" position, in which a stream of heated air can be delivered towards the de-icing air outlet duct, and a mixture of cold air and heated air can be delivered towards the lower air duct.

Some preferred embodiments of the invention will be described below, by way of example only and with reference to the accompanying drawings.

BRIEF DESCRIPTION OF THE DRAWINGS

FIG. 2 is a view as seen in the direction of the arrow 2 in FIG. 1.

FIG. 3 is a view in perspective showing the distributor valve in a first embodiment of the invention.

FIG. 4 is a view in transverse cross section of the distributor valve of FIG. 3.

FIG. 5 is a view in perspective showing the distributor valve in another embodiment of the invention.

FIG. 6 is a view in transverse cross section showing the distributor valve of FIG. 5.

DESCRIPTION OF PREFERRED EMBODIMENTS OF THE INVENTION

Figure 1:
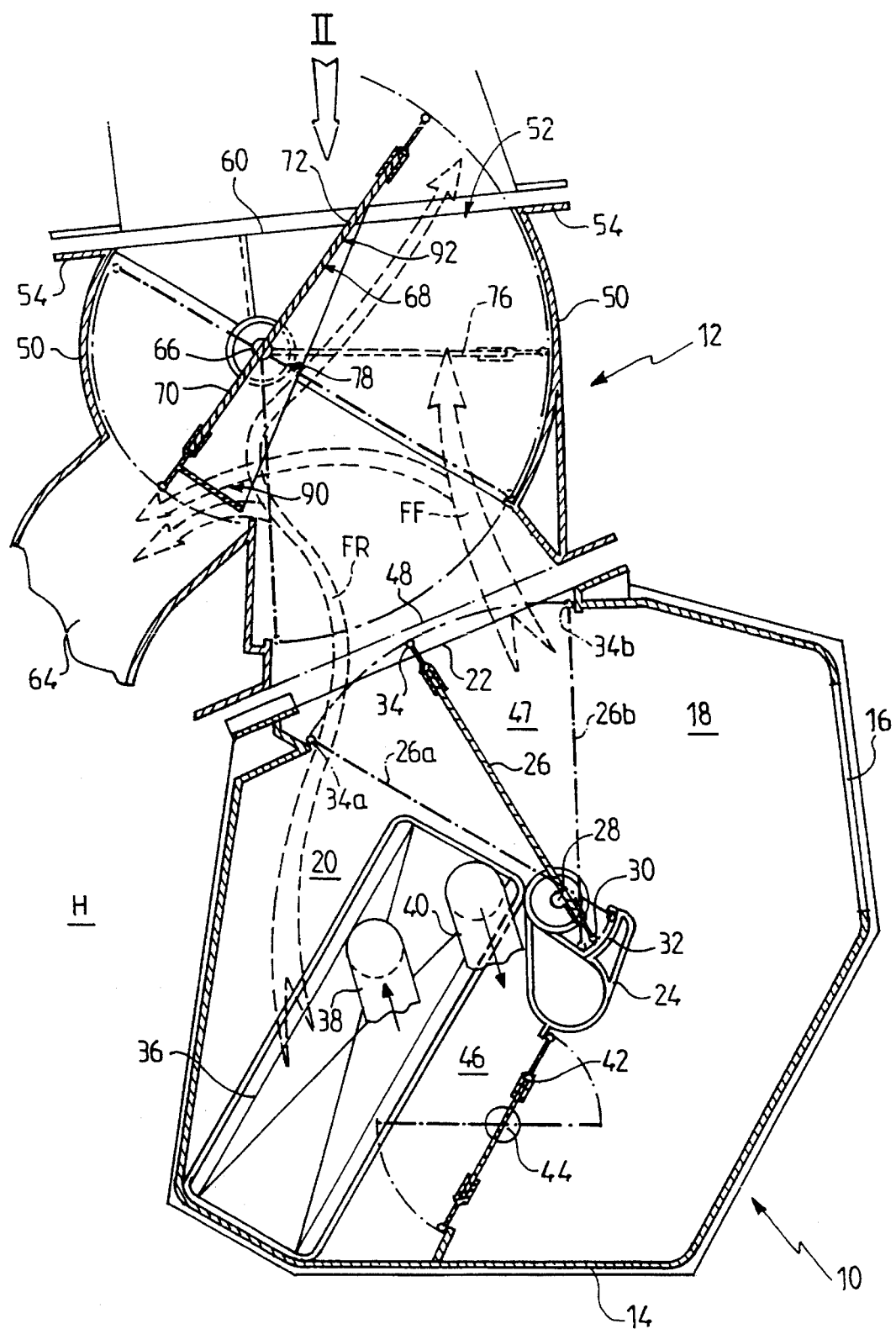
FIG. 1 is a view in transverse cross section of a heating and ventilating installation having a distributor box in accordance with the invention.

The installation shown in FIG. 1 essentially comprises a heater housing 10 and a distribution housing 12 (referred to herein as a distributor box). The heater housing 10 is bounded by a peripheral wall 14 having generatrices which are parallel to each other, and by end walls which are arranged at right angles to the above mentioned generatrices. The housing 10 has an air inlet 16 which is arranged to be connected to the outlet of a motorised fan unit (not shown) which is arranged to deliver cold air, which may be air conditioned, into the interior of the heater housing 10. The inlet 16 feeds two distinct branches, namely a cold air transmission branch 18 and an air heating branch 20. The branches 18 and 20 both lead to a common air outlet 22, which is of generally rectangular shape and which is open into the distributor box 12.

The cold air transmission branch 18 and the air heating branch 20 are separated from each other by a central bulkhead 24 which lies in a central region of the housing 10. The branches 18 and 20 are also separated from each other by a mixing valve 26 which is mounted for pivoting movement about an axis 28 lying close to the bulkhead 24 and extending parallel to the generatrices of the peripheral wall 14, that is to say at right angles to the plane of the drawing.

The mixing valve 26 has an inner end element 30 which lies close to the axis 28, and which cooperates sealingly with a cylindrical portion 32 of the bulkhead 24. The valve 26 also has an outer end element 34, opposed to the inner end element 30 and spaced some distance away from the axis 28. The outer end element 34, which constitutes the free end of the mixing valve 26, extends, away from the axis 28 and towards the common air outlet 22. In other words, the mixing valve 26 extends from its pivot axis 28 towards the common air outlet 22 of the heater housing 10. The mixing valve may assume two extreme positions, namely a first extreme position 26a and a second extreme position 26b. In the position 26a, to which a position 34a of the outer end element 34 corresponds, the air heating branch 20 is closed, while in the other extreme position 26b, in which the outer end element 34 is in a position 34b, the cold air transmission branch 18 is closed. The outer end element 34 of the valve may thus assume the two extreme positions 34a and 34b which lie respectively to the right and left hand sides of FIG. 1, though it can of course assume any intermediate position between them. In the drawing, the mixing valve 26 is shown in one of these intermediate positions.

The air heating branch 20 contains within it a heat exchanger 36, which preferably consists of a radiator through which flows the coolant fluid from the engine of the motor vehicle in which the installation is mounted. For this purpose, the heat exchanger includes two branch tubes 38 and 40, arranged for the admission and evacuation of the coolant fluid respectively. The heat exchanger 36 heats the air which is introduced into the air heating branch via the cold air inlet 16 and which passes towards the common air outlet 22.

As can also be seen in FIG. 1, an admission valve 42 is mounted for pivoting movement about an axis 44 which extends parallel to the pivot axis 28 of the mixing valve 26. The air admission valve 42 controls the flow of the cold air into the air heating branch 20. The admission valve 42 lies at the inlet end 46 of the air heating branch 20, which is delimited between the central bulkhead 24 and the lower portion of the peripheral wall 14 of the heater housing 10. The admission valve 42 is arranged to assume two different positions, namely a closed position and an open position. In its closed position, the flow of cold air is unable to enter the air heating branch 20 through its inlet 46, while in the open position of the valve 42, this air flow can freely pass through the inlet 46 so as then to be heated by heat transfer in the heat exchanger 36 before being passed finally to the air outlet 22. When the admission valve 42 is in its closed position, the mixing valve 26 is also in its closed position (i.e. position 26a) with its outer end element 34 then being in the position 34a on the left of FIG. 1.

When the admission valve 42 is in its open position, on the other hand, the mixing valve 26 is able to be adjusted to any selected intermediate position between its first extreme position 26a and its second extreme position 26b, so as to set a desired proportion between, on the one hand, the cold air stream indicated by the arrow FF which flows in the cold air transmission branch 18, and, on the other hand, the heated air flow (indicated by the arrow FR) in the air heating branch 20.

As can be seen in FIG. 1, the mixing valve 26 is, by contrast with the practice in the prior art, arranged downstream of the cold air transmission and air heating branches 18 and 20 (with reference to the direction of flow of the two air streams in these two branches). In other words, the mixing valve 26 lies in a junction zone 47 between the two branches 18 and 20, on the same side as the air outlet 22. It should also be noted that the mixing valve 26 extends from its pivot axis 26 in the direction of flow of the two air streams FF and FR in the branches 18 and 20. As a result, it is possible to adjust very nicely the proportion between the cold air stream FF and the heated air stream FR, without the mixing valve being liable to pivot under the effect of air pressure due to one or other of these two air streams.

Constructed as described above, the heater housing 10 enables a stream of cold air FF and a stream of heated air FR to be obtained in adjustable proportions adjacent to each other, so that what is referred to as stratification of temperature can be obtained.

The two air streams FF and FR then pass into the distributor box 12, which has an inlet 48 communicating directly with the adjacent common air outlet 22 of the heater housing 10. The distributor box 12 is bounded by a side wall 50 having parallel generatrices, and by end walls. In a region opposite to that in which the inlet 48 is situated, the distributor box 12 has a generally rectangular exit mouth 52, which is also shown in FIG. 2. As is best seen in FIG. 2, the exit mouth 52 is bounded by two long sides 54, two short sides 56, and two cross walls 58 which are parallel to the two short sides 56. In this way the exit mouth 52 defines a central outlet port 60 and two side outlet ports 62. The central outlet port 60 is a de-icing air outlet port, while the side ports 62 are ventilating air outlet ports. The central port 60 is arranged to deliver air towards the windshield (not shown) of the vehicle, while the two ventilating air ports 62 are arranged to deliver air to vents situated on the fascia (not shown) of the vehicle.

Close to the inlet 48 of the distributor box 12, there is also provided a lower air duct 64, which serves as a ventilating air duct for delivering air downwardly towards the lower part of the cabin H of the vehicle, that is to say towards the feet of the occupants of the vehicle.

A distributor valve 68 is arranged within the distributor box 12 for pivoting movement about a pivot spindle on a pivot axis 66. The purpose of this distributor valve 68 is to distribute the air streams FF and FR between the ports 60, 62 and duct 64 as desired by the user. The valve 68 has two portions 70 and 72, which are seen best in FIGS. 3 and 4, and which lie respectively on either side of the pivot axis 66. The first valve portion 70 controls the main air inlet 48 of the distributor box, together with the lower air duct 64; and the second valve portion 72 controls the ports 60 and 62. As can be seen best in FIG. 3, the portion 70 of the valve 68 is generally rectangular in shape and extends over the whole length of the valve, along the pivot axis 66.

The second valve portion 72 also extends over the same length as the valve in the direction of the axis 66, but this portion 72 is divided into three vanes. These comprise a central vane 74, generally rectangular in shape and extending in the same plane as the valve portion 70, together with two side vanes 76, again generally rectangular and defining an angle A (see FIG. 4) with the plane of the valve portion 70. The central vane 74 controls air flow to the de-icing air outlet port 60, while the side vanes 76 control air flow to the two ventilating air outlet ports 62. The general structure of such a valve is described in the specification of French patent application No. 90 03279 mentioned above.

In operation, and in a manner generally known per se, the distributor valve 68 is arranged to assume five different distribution positions, namely:

a de-icing position in which the air stream admitted into the distributor box 12 is able to leave the latter only through the outlet port 60, a "de-icing and feet warming" position in which the air stream is able to leave the distributor box both through the de-icing air outlet port 60 and via the lower air duct 64, a "feet warming" position in which the air stream is only able to escape from the distributor box through the lower air duct 64, a ventilating and foot warming position, in which the air stream is able to leave the distributor box both through the ventilating air ports 62 and through the lower air duct 64, and a ventilating position in which the air stream is able to leave the distributor box only via the ventilating air outlet ports 62.

As is shown in FIGS. 1, 3 and 4, the distributor valve 68 includes a guide channel 78 which is arranged in a central region of the valve, that is to say in the central region of the first valve portion 70 and in the central region (i.e. the vane 74) of the second valve portion 72. The channel 78 extends in a generally transverse direction with respect to the pivot axis 66.

As is shown in FIGS. 3 and 4, the channel 78 extends over a common face 79 of the valve. It is bounded partly by this face 79, partly by two side walls 80 which extend in substantially parallel planes which lie at right angles to the common face 79 of the valve, and partly by an anterior wall 82 which joins the two side walls 80 together, and which is attached to the valve face 79 in a plane which is substantially at right angles to the plane of the latter. The side walls 80 are substantially triangular, each defining a first side 84 attached to the valve member, a second side 86 which defines an acute angle with the side 84, and a third side 88 which lies on the same side as the inlet 90 of the channel 78. This inlet 90 is bounded by the anterior wall 82 and lies close to the free end of the first valve portion 70. The channel 70 has an outlet 92 which is open on the same side as the second valve portion 72. Constructed in this way, the channel 78 enables the stream of heated air FR to be directed as shown in FIG. 1.

When the distributor valve 68 is in the de-icing position or in the "de-icing and foot warming" position (as is shown in FIG. 1), the stream of heated air FR, entering the distributor box 12 through its inlet 48 (towards the left in FIG. 1) becomes channeled by the channel 78, the inlet 90 of which lies facing that side of the inlet 48 through which the heated air stream FR enters the distributor box. The heated air stream, thus directed, is delivered to the de-icing air outlet duct 60 without being mixed with the cold air stream FF, and this gives an improvement in windshield de-icing and de-misting performance.

In the "de-icing and foot warming" position shown in FIG. 1, the heated air stream FR and the cold air stream FF are enabled to mix before they reach the lower air duct 64 for subsequently delivery to the lower part of the cabin, so that this air is then at an intermediate temperature lower than that of the air stream delivered to the windshield for de-icing of the latter.

In the embodiment shown in FIGS. 3 and 4, each of the side walls 80 extends on both sides of the valve with reference to the axis 66, that is to say they are arranged on both of the two valve portions 70 and 72. By contrast, in the alternative embodiment shown in FIGS. 5 and 6, the side walls 80, which again have a triangular shape, are arranged on only one side of the valve, i.e. to one side of the axis 66, that is to say they are on the first valve portion 70 only.

The guide channel of the distributor valve thus enables the flow of heated air to be properly directed, and leads to improved de-icing and de-misting of the windshield when the valve is in either its de-icing position or its "de-icing and foot warming" position.

What is claimed is:

1. A heating and ventilating installation for the cabin of a motor vehicle having a windshield, the installation comprising a distributor box having an air inlet defining a first side and a second side thereof, for admitting at least one of a heated air stream and a cold air stream into the distributor box through said first and second sides of the air inlet respectively, and a plurality of air outlets for leading air to different zones of the cabin, said outlets including a de-icing air outlet port directed towards the windshield, the installation including a distributor valve within the distributor box, pivot means defining a pivot axis for the distributor valve and mounting the latter within the distributor box, for pivoting movement about said axis between a plurality of positions whereby to distribute the air between said outlets, wherein the distributor valve includes means defining a guide channel having an inlet and an outlet and extending in a general direction which is transverse with respect to said pivot axis, so that in de-icing positions of the valve, the inlet of the guide channel is open towards the first side of the air inlet of the distributor box, while its outlet is open towards the de-icing outlet port, wherein the means defining the said guide channel have a distributor valve face, two side walls defining planes substantially parallel to each other and at right angles to said face of the valve, and an anterior wall defining the inlet of the guide channel, with said anterior wall joining the side walls together and being joined to said face of the valve in a plane substantially at right angles to the plane of the valve.

2. An installation according to claim 1, wherein each said side wall is substantially triangular and defines a first side thereof joined to the distributor valve, a second side defining an acute angle with said first side, and a third side joined to the said anterior wall and partly defining the inlet of the guide channel.

3. An installation according to claim 1, wherein both of said side walls are arranged wholly on the same side of the distributor valve with respect to said pivot axis.

4. An installation according to claim 1, wherein said side walls defining the guide channel extend over both sides of the distributor valve with respect to said pivot axis.

* * * * *